US009313642B2

(12) United States Patent
Punz

(10) Patent No.: US 9,313,642 B2
(45) Date of Patent: Apr. 12, 2016

(54) METHOD AND A SYSTEM FOR DISTRIBUTING OF USER EQUIPMENT CONTEXT IN AN EVOLVED PACKET SYSTEM

(75) Inventor: Gottfried Punz, Dossenheim (DE)

(73) Assignee: NEC EUROPE LTD., Heidelberg (DE)

( * ) Notice: Subject to any disclaimer, the term of this patent is extended or adjusted under 35 U.S.C. 154(b) by 200 days.

(21) Appl. No.: 14/008,670

(22) PCT Filed: Apr. 5, 2012

(86) PCT No.: PCT/EP2012/056362
§ 371 (c)(1),
(2), (4) Date: Sep. 30, 2013

(87) PCT Pub. No.: WO2012/136812
PCT Pub. Date: Oct. 11, 2012

(65) Prior Publication Data
US 2014/0022996 A1  Jan. 23, 2014

(30) Foreign Application Priority Data
Apr. 6, 2011  (EP) .................................... 11002855

(51) Int. Cl.
*H04W 8/02* (2009.01)
*H04W 36/16* (2009.01)
(Continued)

(52) U.S. Cl.
CPC *H04W 8/02* (2013.01); *H04W 8/12* (2013.01); *H04W 36/0033* (2013.01); *H04W 36/12* (2013.01); *H04W 36/16* (2013.01)

(58) Field of Classification Search
CPC ......... H04W 8/02; H04W 8/12; H04W 76/02; H04W 92/045; H04W 48/17; H04W 60/00; H04W 24/08; H04W 36/22; H04W 36/08; H04W 92/20; H04W 36/0033

USPC ............... 370/328, 329, 331–334; 455/422.1, 455/405, 436–444, 435.1, 311, 524
See application file for complete search history.

(56) References Cited

U.S. PATENT DOCUMENTS

2010/0135245 A1\* 6/2010 Zhu et al. ...................... 370/331
2010/0184432 A1\* 7/2010 Yano et al. .................. 455/435.1
(Continued)

FOREIGN PATENT DOCUMENTS

| EP | 2265054 A1 | 12/2010 |
| EP | 2288185 A1 | 2/2011 |
| WO | 2010080056 A1 | 7/2010 |

OTHER PUBLICATIONS

3 GPP Specification detail—TS 23.401.
(Continued)

*Primary Examiner* — Edan Orgad
*Assistant Examiner* — Ivan O Latorre
(74) *Attorney, Agent, or Firm* — Young & Thompson

(57) ABSTRACT

A method for distributing user equipment context in an evolved packet system, including a plurality of user equipment, at least one eNodeB, a first mobility management entity and a second mobility management entity and one serving gateway connected to the first and second mobility management entity, the plurality of user equipment being connected via one of the eNodeBs to the second mobility management entity and to the serving gateway, wherein the user equipment context for the plurality of user equipment is each stored at the second mobility management entity, includes: a) transferring bulk user equipment context for the plurality of user equipment context, each having a mobility management entity code, to the first mobility management entity, b) reconfiguring the mobility management entity codes, c) storing the transferred user equipment context in the first mobility management entity, and d) transferring reconfigured mobility management entity codes to the at least one eNodeB.

19 Claims, 4 Drawing Sheets information flow for signaling and context transfer for proposed ES mechanism (offloading phase)

(51) Int. Cl.
*H04W 36/12* (2009.01)
*H04W 36/00* (2009.01)
*H04W 8/12* (2009.01)

(56) References Cited

U.S. PATENT DOCUMENTS

| | | | | |
|---|---|---|---|---|
| 2011/0090857 | A1* | 4/2011 | Guo | 370/329 |
| 2011/0103310 | A1* | 5/2011 | Stojanovski et al. | 370/328 |
| 2011/0122779 | A1* | 5/2011 | Meirosu | H04W 28/08 370/252 |
| 2011/0122845 | A1* | 5/2011 | Meirosu | H04W 36/0055 370/332 |
| 2011/0153844 | A1* | 6/2011 | Bovo et al. | 709/228 |
| 2011/0235505 | A1* | 9/2011 | Eswara et al. | 370/221 |
| 2011/0269499 | A1* | 11/2011 | Vikberg et al. | 455/524 |
| 2012/0147733 | A1* | 6/2012 | Wang | 370/216 |
| 2012/0314569 | A1* | 12/2012 | Liu | H04W 36/0094 370/230 |
| 2013/0203415 | A1* | 8/2013 | Arvidsson et al. | 455/435.1 |
| 2013/0301610 | A1* | 11/2013 | Ali et al. | 370/331 |

OTHER PUBLICATIONS

3 GPP Specification detail—TS 36.300.
3 GPP Specification detail—TS 36.413.
Huawei, China Mobile, "Load balancing and overload handling", 3GPP TSG SA WG2 Meeting #64, Apr. 2008.

* cited by examiner

EPS architecture (simplified)

(Related Art)

MME state model for ES bulk UE context transfer scheme (overall level)

information flow for signaling and context transfer for proposed ES mechanism (offloading phase)

METHOD AND A SYSTEM FOR DISTRIBUTING OF USER EQUIPMENT CONTEXT IN AN EVOLVED PACKET SYSTEM

BACKGROUND OF THE INVENTION

1. Field of the Invention

The present invention relates to a method and a system for distributing of user equipment context in an evolved packet system, comprising a plurality of user equipment, at least one eNodeB, at least a first mobility management entity and a second mobility management entity and at least one serving gateway connected to at least a first and a second mobility management entity, wherein the plurality of user equipment is connected via one of the eNodeBs to a second mobility management entity and to the at least one serving gateway, wherein the user equipment context for the plurality of user equipment is each stored at the second mobility management entity.

2. Description of the Related Art

Long term evolution (LTE) as mobile communication standard generally provides higher download capabilities for mobile user equipment compared with the former UMTS-standard. However, with the advent of new features like Machine-Type Communication, for example laid down in standard 3GPP TS 22.368, "Service requirements for Machine-Type Communications (NATO); Stage 1", the amount of context data to be stored in the core network ON is increased while at the same time the relationship between the amount of signaling and the amount of data traffic is changed: For example machine-type communication due to low data volume, infrequently active and low mobility type of user equipment occurs.

In FIG. 1, a conventional evolved packet system architecture is shown which is simplified only showing relevant entities with regard to the present patent application. A user equipment UE is connected to an evolved Node B which is located in a Radio Access Network RAN. The evolved Node B (eNB) is connected via interface S1-MME to the mobility management entity MME located in the core network CN related to the control plane and via S1-U interface to a serving gateway SGW also located in the core network CN related to the user plane. The mobility management entity MME is connected via interface S11 to the serving gateway SGW. The eNB is the radio base station in the Radio Access Network RAN. The eNB or more general the eNBs distribute initial requests of the user equipment (e.g. for attachment) according to the Network Node Selection Function NNSF in the Radio Access Network RAN, for example as laid down in standard 3GPP TS 36.300 "Evolved Universal Terrestrial Radio Access (E-UTRA) and Evolved Universal Terrestrial Radio Access Network (E-UTRAN); Overall description; Stage 2.".

For initial events when no so-called user equipment context is yet stored, meaning that the user equipment is not known to a mobility management entity, these decisions are typically based on load considerations, including also explicit overload indications by mobility management entities (MME). After an initial request by the user equipment has been accepted by the mobility management entity for this user equipment, the user equipment context is created and stored in the mobility management entity MME. It is maintained in the mobility management entity MME as long as the user equipment UE remains attached or roams to an area where a corresponding evolved Node B (eNB) has only connectivity with another mobility management entity. In this case the user equipment context is transferred from the old mobility management entity to the new mobility management entity during a Tracking Area Update (TAU) in idle mode. or within a handover procedure in active mode.

In the evolved packet system the user equipment receives a temporary identifier, the so called Global Unique Temporary Identity GUTI, which is related to the mobility management entity storing the user equipment context data. The mobility management entity identification is part of the Global Unique Temporary Identity GUTI. If the Global Unique Temporary identity (GUTI) is changed this affects the user equipment and requires a signaling between the core network (CN), respectively a corresponding device or entity in the core network, and the user equipment (UE). The following relations hold, wherein "+" is to be understood as concatenation:

GUTI GUMMEI M-TMSI Global Unique Temporary (UE) Identifier

GUMMEI=MCC+MNC+MME1 Global Unique MME identifier

MMEI=MMEGI+MMEC MME identifier

S-TMSI=MEC+M-TMSI epS-Temporary Mobile Subscriber identity

M-TMSI Mme-Temporary Mobile Subscriber Identity

In conventional evolved packet system an exchange of user equipment contexts between different mobility management entities is only possible in a reactive manner. Another disadvantage is that in this case a new temporary identifier has to be allocated for the user equipment, involving signaling with the user equipment.

BRIEF SUMMARY OF THE INVENTION

It is therefore an objective of the present invention to provide a method and a system for distributing of user equipment context in an evolved packet system which are more flexible in particular with regard to Machine-Type Communication with an evolved packet system.

It is a further objective of the present invention to provide a method and a system for distributing of user equipment context in an evolved packet system, enabling a faster while reliable offload of user equipment contexts from one mobility management entity to another mobility management entity.

An even further objective of the present invention is to provide a method and a system for distributing of user equipment context in evolved packet system which are easy to implement, in particular by using most of the conventional procedures and devices in the evolved packet system.

According to the invention the objectives are accomplished by a method and a system of distributing of user equipment context.

According to the invention a method for distributing of user equipment context in an evolved packet system, comprising
a plurality of user equipment,
at least one eNodeB,
at least a first mobility management entity and a second mobility management entity and
at least one serving gateway connected to at least the first and second mobility management entity, wherein the plurality of user equipment is connected via one of the eNodeBs to the second mobility management entity and to the at least one serving gateway, wherein
the user equipment context for the plurality of user equipment is each stored at the second mobility management entity.

The method is characterized by the steps of
a) Transferring bulk user equipment context for the plurality of user equipment context stored at the second mobility management entity to the first mobility management entity within a first transfer time, wherein the user equipment context includes for each user equipment a mobility management entity code, b) Reconfiguring the mobility management entity codes by and in the first mobility management entity, c) Storing the transferred user equipment context in the first mobility management entity, and d) Transferring the reconfigured mobility management entity codes to the at least one eNodeB.

The system for distributing of user equipment context in an evolved packet system, includes a plurality of user equipment, at least one eNodeB, a first mobility management entity and a first serving gateway connected to each other, a second mobility management entity and a second serving gateway connected to each other, wherein the plurality of user equipment is connected via the eNodeB to the second mobility management entity, and their user equipment context is each stored at the second mobility management entity.

The system is characterized in that the second mobility management entity is operable to transfer bulk user equipment context for the plurality of user equipment context stored at the second mobility management entity to the first mobility management entity within a first transfer time, wherein the user equipment context includes for each user equipment a mobility management entity code, and that the first mobility management entity is operable to reconfigure the mobility management entity codes in the first mobility management entity, to transfer the reconfigured mobility management entity codes to the at least one eNodeB and to store the transferred user equipment context.

According to the invention it has first being recognized that the method and the system provide greatly reduced offload times for offloading a user equipment context from one mobility management entity to load the user equipment context to another mobility management entity.

According to the invention it has first being recognized that the method and the system are more flexible, since a distribution of user equipment context may be performed proactively and not only reactively, wherein the latter mobility management offload in a conventional evolved packet system is based on completion of periodic Tracking Area Updates (TAU) per user equipment.

According to the invention it has first being recognized that the method and the system enable a reuse of existing S1-AP protocol functionality.

According to the invention it has first being first recognized that the method and the system provides non-involvement of user equipment when distributing of user equipment context in the evolved packet system therefore reducing data to be transferred between the core network and the radio access network, as well as avoiding establishment of a signalling connection with the user equipment.

According to the invention it has first being recognized that the method and the system are faster and more efficient then conventional methods and systems, since the method and the system may be also be applied or used for any situation, where a user equipment context offload is desirable, for example a controlled taking out of services of mobility management entities, e.g. for maintenance or re-configuration, or load re-balancing.

Further features, advantages and preferred embodiments of the present invention are described in the following sub-claims.

According to a preferred embodiment transferring bulk user equipment context according to step a) is performed additionally for the serving gateways. This enables the serving gateways to be informed about the change in the mobility management entity in an easy and fast way.

According to a further preferred embodiment the method comprises the further step of d) sending at least one activation message to the serving gateway by the first mobility management entity. This provides an even easier informing procedure for updating the serving gateways with the information about the changed mobility management entity. When using a mobility management entity configuration update message according to 3GPP TS 36.413 "Evolved Universal Terrestrial Radio Access Network (E-UTRAN); S1 Application Protocol (S1AP)", the MME configuration update message has to be sent with the reconfigured mobility management entity codes.

According to a further preferred embodiment a method comprises the further step of e) switching the second mobility management entity to an energy saving state. One of the advantages is, that for example when the offload procedure of user equipment context from an old mobility management entity to a new mobility management entity is completed, the old mobility management entity maybe switched to an energy saving sate. This reduces greatly the energy consumption of the offloaded mobility management entity.

According to a further preferred embodiment user equipment context stored at the second mobility management entity which has been altered during the first transfer time at the second mobility management entity is transferred to the first mobility management entity within a second transfer time in a further step f). This enables for example to begin a bulk user equipment context transfer without considering any switching or complicated data exchange with the user equipment before transfer. In a simple and very easy way user equipment context at a second mobility management entity still being modified, due to normal operation, is transferred again to the first mobility management entity when being changed during the transfer time. The amount of user equipment context altered or amended during a transfer time can be estimated to a low percentage of the user equipment context to be transferred in step f). This also corresponds to the short transfer time, in relation to the overall number of user equipment context changes per time interval.

According to a further preferred embodiment user equipment context stored at the second mobility management entity which has been altered during the second transfer time at the second mobility management entity is transferred to the first mobility management entity within a certain third transfer time in a further step g). Compared to step f) the number of user equipment context to be transferred within the third transfer time is only a fraction of the number of the user equipment context to be transferred in the second transfer time, Further the third transfer time is only a fraction of the second transfer time. The first, second and third transfer provides transferring nearly all user equipment contexts during the steps a), f) and g).

According to a further preferred embodiment transferring hulk user equipment context according to step f) and/or g) is performed additionally for the serving gateways. This enables the server gateways to be updated about the change in the mobility management entity in a faster and easier way.

According to a further preferred embodiment the second mobility management entity to which the user equipment is connected initiates the transfer of the user equipment context, preferably via bulk data transfer mechanism. This enables a transfer without the user equipment to be included in the procedure for transferring user equipment context from one mobility management entity to another. A bulk data transfer mechanism is for example a FTP-like mechanism.

According to a further preferred embodiment the user equipment context includes a correlation identifier. With the correlation identifier a subsequent activation of one particular transfer can be achieved, differentiated from other, potentially many parallel bulk user equipment context transfers.

According to a further preferred embodiment when the energy saving state of the second mobility management entity is revoked at least corresponding steps a)-c) are performed with the first and second mobility management entity being switched. This enables in an easy way to load the second mobility management entity again with the corresponding user equipment context after the energy saving state of the second mobility management entity has been revoked.

According to a further preferred embodiment initiation of step a) is triggered externally of the second mobility management entity, preferably a device in an operation-and-maintenance system. Step a), i.e. offloading of the user equipment context from the second mobility management entity and loading this user equipment context to the first mobility management entity provides an easy control of the mobility management entities. For example for maintenance reasons an operation-and-maintenance device may trigger the second mobility management entity to switch to an energy saving state. When the second mobility management receives this trigger, steps a) to c) are performed to offload the user equipment context from a second mobility management and to the first mobility management. After completion of steps a) to c) the second mobility management entity enters the energy saving state, in particular is shut down.

According to a further preferred embodiment at least the second mobility management entity has an energy saving state as at least one its of operational states. One of the advantages is, that for example when the offload procedure of user equipment context from an old mobility management entity to a new mobility management entity is completed, the old mobility management entity maybe switched to an energy saving sate. This reduces greatly the energy consumption of the offloaded mobility management entity.

BRIEF DESCRIPTION OF THE DRAWINGS

There are several ways how to design and further develop the teaching of the present invention in an advantageous way. To this end it is to be referred to the patent claims and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing

DETAILED DESCRIPTION OF THE PREFERRED EMBODIMENTS

Figure 1:
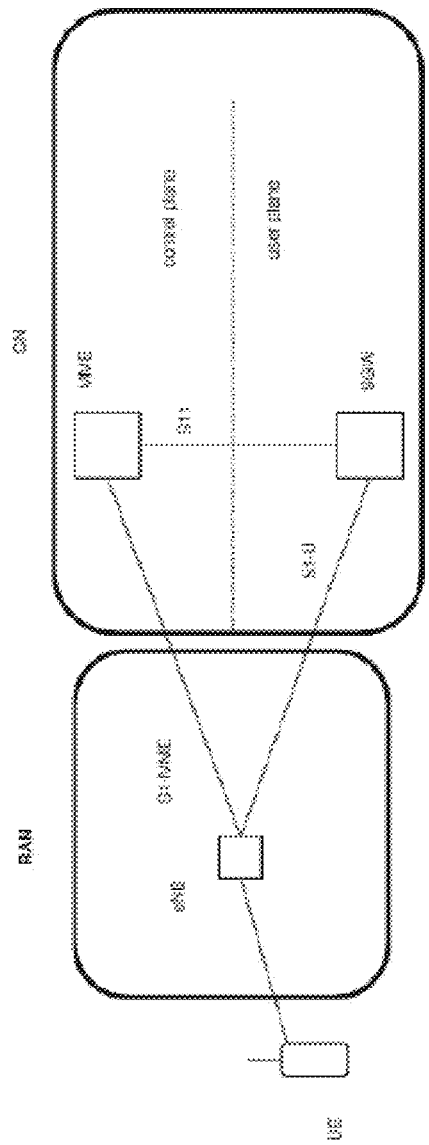
FIG. 1 is illustrating a conventional evolved packet system architecture.

FIG. 1 is illustrating a conventional evolved packet system architecture.

In FIG. 1 a user equipment UE is connected to an evolved Node B eNB in a radio access network. The evolved Node B eNB in the radio access network RAN is connected by S1-MME connection to a mobility management entity MME located in a core network ON. The evolved Node B eNB is also connected via an S1-U connection to a serving gateway SGW also located in the core network CN. The mobility management entity MME in the control plane and the serving gateway in the user plane are connected via in S11 connection to each other. In a real evolved packet system architecture these appear in multiple instances, for example millions of user equipments, thousands of evolved Node Bs eNBs and dozens of core network nodes.

Figure 2:
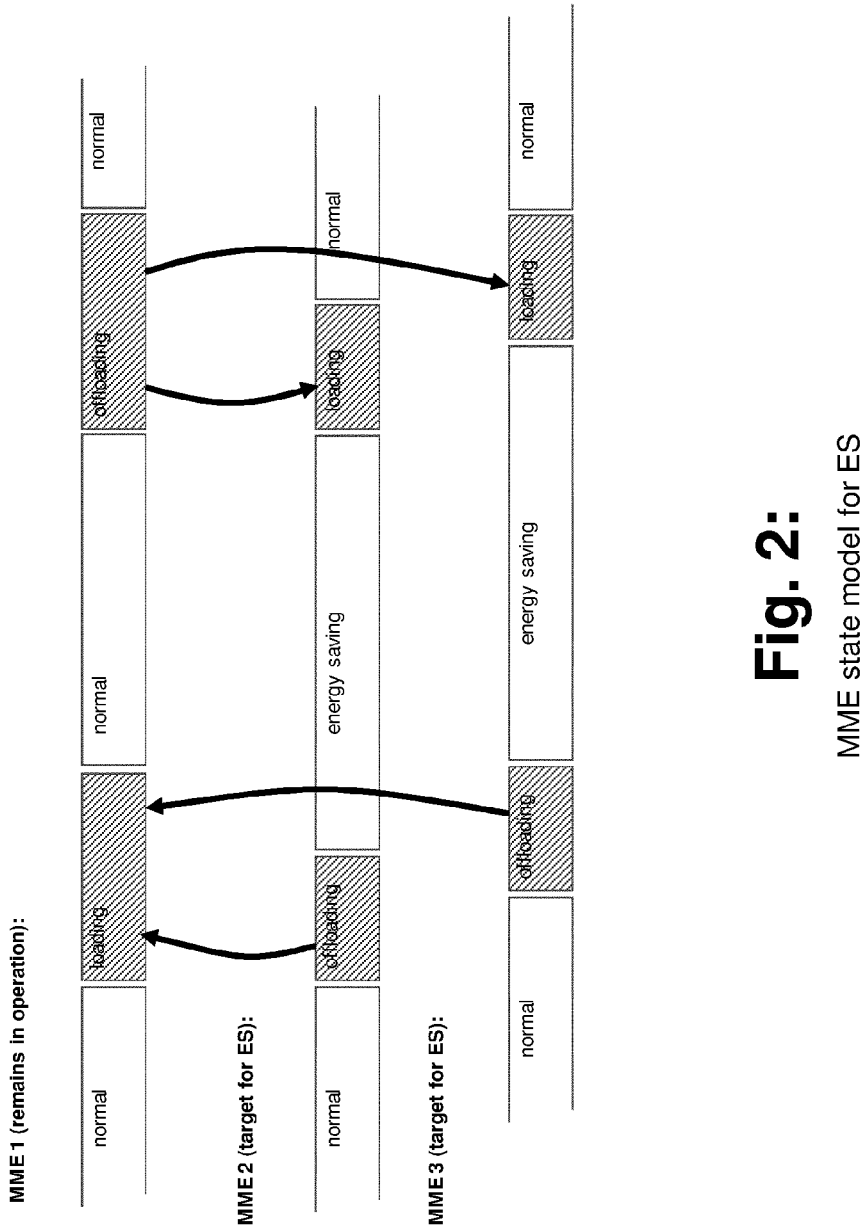
FIG. 2 is illustrating a mobility management entity state model with an energy saving state.

FIG. 2 is illustrating a mobility management entity state model with an energy saving state.

In FIG. 2 a mobility management entity state model for energy saving is described along the time axis (from left to right). The duration of time periods indicated in FIG. 2 are not scale, e. g. loading and offloading time periods are preferably performed on the order of one or two minutes. At the beginning the three mobility management entities MME1, MME2 and MME3 are each in a normal operational state. First a second mobility management MME2 receives an external trigger and enters an offloading state, i.e. performs a bulk user equipment context transfer to the first mobility management entity MME1. During this time period also the third mobility management entity MME3 receives an external trigger and offloads user equipment context to the first mobility management entity MME1. Therefore the first mobility management entity MME1 enters its loading state when receiving user equipment context data from the second mobility management entity MME2 and switches back to its normal operational state when both the transfers of the user equipment context from the second and the third mobility management entity MME2, MME3 are completed. The second and third mobility management entity MME2, MME3 are switching to their energy saving states when the corresponding user equipment context transfers have been completed.

After a certain time in the energy saving state of the second mobility management entity MME2 the first mobility management entity MME1 receives a trigger for offloading user equipment context back to the second and third mobility management entities MME2 and MME3. The second mobility management entity MME2 switches back to its loading state and the third mobility management entity MME3 accordingly. When the transfer of the user equipment context from the first mobility management entity MME1 to the second and third mobility management entities MME2 and MME3 is completed all three mobility management entities MME1, MME2 and MME3 switch back to their normal operational states.

Figure 3:
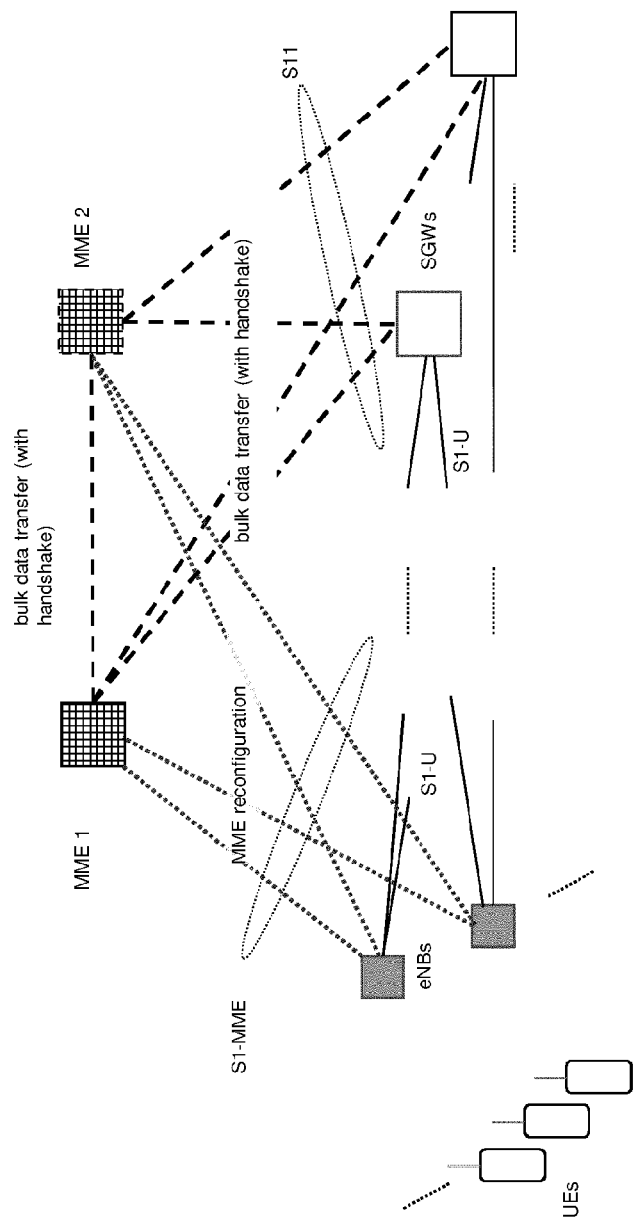
FIG. 3 is illustrating a bulk user equipment context transfer scheme according to a first embodiment of the present invention.

FIG. 3 is illustrating a bulk user equipment context transfer scheme according to a first embodiment of the present invention, In FIG. 3 a bulk user equipment context transfer scheme on the overall level is shown. A plurality of user equipment UE is connected through a plurality of evolved node Bs eNBs, located in a radio access network, to a core network CN. The evolved node Bs eNBs are connected via S1-U connections to a plurality of serving gateways SGWs, located in the core network. Further the evolved node Bs eNBs are connected via S1-MME connections each to the first mobility management entity MME1 and the second mobility management MME2. At the beginning the user equipment context is stored in the second mobility management entity MME2. When performing a bulk data transfer with handshake from the second mobility management entity MME2 to the first mobility management entity MME1 the second mobility management entity MME2 further performs a bulk data transfer with handshake of the user equipment context to the serving gateways SGWs. The second mobility management entity MME2 performs a mobility management entity reconfiguration updating the evolved node B eNBs about the fact that mobility management entity code MMEC is no longer served by the second mobility management entity MME2 but by the first mobility management entity MME1.

Figure 4:
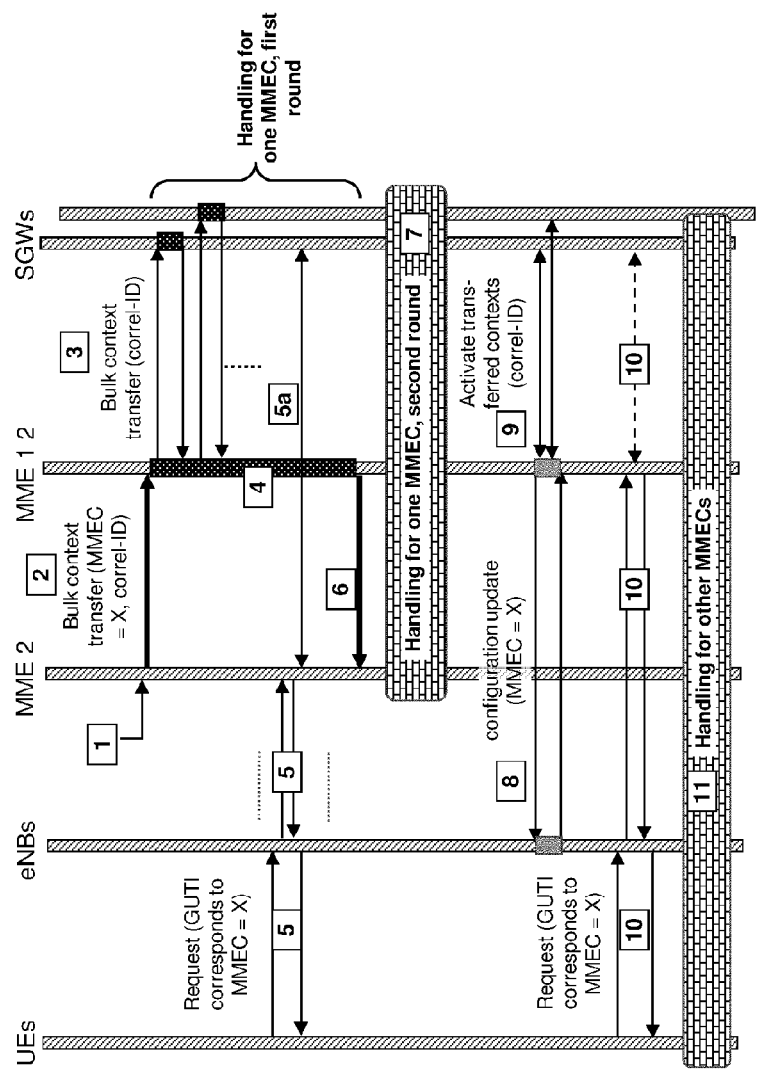
FIG. 4. is illustrating a method of a second embodiment of a present invention.

FIG. 4 is illustrating a method of a second embodiment of a present invention.

In FIG. 4 the detailed sequence of the information flow for signaling and user equipment context transfer is shown.

In a first step 1, the second mobility management entity MME2 as a target for energy saving, receives a trigger (e.g. from an operation and maintenance system) to go into state "offload" for the purpose of energy saving.

In a second step 2 the second mobility management entity MME2 initiates the context transfer to the first mobility management entity MME1 which remains in normal operation state via some bulk data transfer mechanism, indicating the mobility management entity code MMEC to be handled (MEC=X). Further a correlation ID for later cross reference is included. It may follow a preconfigured scheme regarding the sequence of mobility management entity codes MMECs, or it may decide dynamically. The data stream shall be block-structured and obey a particular sequence regarding serving gateways SGW. After the data block for a particular serving gateway SGW has been completely transferred, the corresponding bulk context transfer of step 3 can be started.

In a third step 3 the second mobility management entity MME2 performs a corresponding bulk context transfer to every involved serving gateway SGW, including the correlation ID, and receives back an acknowledgement after completion. The amount of user equipment context to be updated on the serving gateways SGW is very small: it is only the IP address of the mobility management entity and mobility management entity TEID for S11, for example as laid down in standard 3GPP TS 23.401: "General Packet Radio Service (GPRS) enhancements for Evolved Universal Terrestrial Radio Access Network (E-UTRAN) access.".

In a fourth step 4 from now on the first and second mobility management entity MME1 and MME 2 as well are engaged in the processing. For an estimation of this duration see below.

In a fifth step 5 if a request from any user equipment UE with a GUTI corresponding to a mobility management code MMEC currently being handled for bulk context transfer between the second and first mobility management entity MME2. MME1 is received by any involved eNB, the requests will still be served by the second mobility management entity MME2, since no update signaling regarding the mobility management entity code MMEC has yet been performed with the eNBs.

In a further step 5*a* if any signaling has to be performed between the second mobility management entity MME2 and the serving gateways SGW allocated per user equipment UE, it happens as normal; i.e. the serving gateway SON does not yet actually use the data received from the second mobility management entity MME2.

In a sixth step 6 the context data transfer from the second mobility management entity MME 2 to the first mobility management entity MME1 for a particular mobility management entity code MMEC=X has been completed and the final acknowledgement is exchanged from the first mobility management entity MME1 to the second mobility management entity MME2. Steps 2 to 6 are considered as the first round of several of the overall procedure.

In a seventh step 7 the second round of bulk context data transfer is performed and includes all user equipment contexts which have been altered during the first round (due to user equipment and network behaviour, shown as steps 5/5*a*). The number of affected user equipment contexts should be smaller by approximately a 3-digit factor, and consequently the processing time will be much smaller (see estimations below). If, for the implementation according to the second embodiment with only two rounds, during this seventh step 7 a request for a user equipment UE with a GUTI corresponding to the mobility management entity code MMEC currently being handled for context transfer is received by any eNB, it cannot be served and leads to an unsuccessful case. The user equipment UE will retry the request and eventually have success (this case should happen rarely, according to the estimations given below). If deemed necessary, e.g. to be confirmed from real timing and performance measurements, it is also possible to apply a third round, to further decrease the time window where such unsuccessful cases happen.

In an eighth step 8 the eNBs are updated about the fact that mobility management entity code MMEC=X is no longer served now by the first mobility management entity MME1 instead of the second mobility management entity MME2. This is a signaling burst for the first mobility management entity MME1, but it can be prepared in advance and the responses can be handled in parallel regarding eNBs. Per eNB it is only a single message and should be handled fast.

In a ninth step 9 the first mobility management entity MME1 sends an activation message, including the correlation ID, to all involved serving gateways SGW.

In a tenth step 10 if a request from any user equipment UE with a GUTI corresponding to the mobility management entity code MMEC=X is received by any eNB, the requests will be served by the first mobility management entity MME1 due to update signaling in step 8. If this tenth step 10 requires any update signaling from the first mobility management entity MME1 to the serving gateway SGW, it will happen normally and the updated data in the serving gateway SGW will take effect, due to activation in step 9.

In an eleventh step 11 the process is repeated for all remaining (to be offloaded) mobility management entity codes MMEC.

After completion of steps 1 to 11 the second mobility management entity MME2 enters the energy saving state. A procedure for loading the second mobility management entity MME2 again after its energy saving state has been revoked that is in particular offloading from the first mobility management entity MME1 is corresponding to the steps 1 to 11, but with reverse allocation of their functionality in the above procedure.

In a active mode the mobility management entities may be involved during a handover of a user equipment, which maybe followed by a tracking area update TAU. The handover with mobility management entity MME involvement and the tracking area update are handled normally during the first phase of bulk user equipment context transfer corresponding to steps 1 to 6. However, a handover with mobility management entity MME involvement or a tracking area update TAU procedure will fail during the second round (or the third respectively final round, depending on how many rounds are used), for example corresponding to step 7, due to the user equipment context not being found where expected on the second mobility management entity MME2. Standard evolved packet system procedures will then apply.

The following estimations are based on the following assumptions:

1. average number of UE contexts on MME: 500.000
2. number of MMECs used per MME: 5
3. size of UE context (on inter-MME interface): 5 Kbyte 4. transmission capacity on inter-MME interface: 250 Mbit/sec
5. average time between periodic TAUs: 3200 sec A rough counting, using maximum values over all items listed in table 5.7.2-1 in standard 3GPP TS 23.401 "MME MM and EPS bearer Contexts" gives approximately 1550 bytes for a user equipment context with one packet data network connection consisting of one bearer. Per packet data network connection approximately 440, per bearer approximately 260 bytes have to be added. An estimation for a reasonable upper bound for most user equipment contexts results in 5 Kbyte as upper bound. A lot of user equipment even would have a smaller user equipment context size in a mobility management entity MME.

With this 100 000 user equipment contexts=500 Mbyte of data has to be transferred for offloading one mobility management entity code from one mobility management entity MME to another mobility management entity; the transfer time maybe approximately 16 seconds. A plausible assumption of an efficient data format and fast database access, storing the user equipment context the transfer time will be increased about a factor of three resulting in 48 seconds allowing also some processing time. Preferably the elapsed time between steps 2 and 6 according to FIG. 4 amounts to ⅙₆th of the average time between conventional periodic traffic area update requests. Consequently during the first phase corresponding to steps 1 to 6 of the user equipment context transfer for offload between the mobility management entities MME 1515 user equipment contexts will have been modified.

The second phase corresponding to step 7 according to FIG. 4 will take ⅙₆th time of the first round, i.e. approximately 0.72 seconds. This means that (⅙₆)² of all user equipment will request their periodic tracking area update TAU during that second period and fail in the first try, but can eventually succeed in their retry. With this same small proportional fraction also other signaling events triggered to the mobility management entity, either by user equipment themselves or by the network, are affected by the mobility management entity offload procedure and need to be retried.

To inform the evolved node Bs about a change in the set of mobility management entity codes MMEC served by the mobility management entity MME the mobility management entity configuration update message MME configuration update message is used, wherein the relevant parts are marked with dashed boxes:

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString (1 .. 150, ...) | | YES | ignore |
| Served GUMMEIs | | 0..<maxnoofRATs> | | The LTE related pool configuration is included on the first place in the list. | GLOBAL | reject |
| >Served PLMNs | | 1..<maxnoofPLMNsPer MME> | | | – | |
| >>PLMN Identity | M | | 9.2.3.8 | | – | |
| >Served GroupIDs | | 1..<maxnoofGroupIDs> | | | – | |
| >>MME GroupID | M | | OCTET STRING (2) | | – | |
| >Served MMECs | | 1..<maxnoofMMECs> | | | – | |
| >>MME Code | M | | 9.2.3.12 | | – | |
| Relative MME Capacity | O | | 9.2.3.17 | | YES | reject |

| Range bound | Explanation |
|---|---|
| maxnoofPLMNsPerMME | Maximum no. of PLMNs per MME. Value is 32. |
| maxnoofRATs | Maximum no. RATs. Value is 8. |
| maxnoofGroupIDs | Maximum no. of GroupIDs per node per RAT. Value is 65535 |
| maxnoofMMECs | Maximum no. of MMECs per node per RAT. Value is 256 |

In summary the present invention provides a mobility management entity offload mechanism through bulk transfer of user equipment context between mobility management entities and serving gateways and a synchronization and/or reconfiguration of evolved node Bs. The present invention further provides a preferable iterative transfer based on blocks of user equipment context, for example defined by mobility management entity codes within the user equipments global unique temporary identifier. The present invention further provides assured consistency of user equipment context change during a still on-going user equipment context transfer using preparation and activation steps.

The present invention further provides a dedicated bulk mode of user equipment context transfer between mobility management entities and serving gateways with interleaved handshake mode, an energy saving related state model in mobility management entities, a reuse of existing S1-AP protocol functionality used in a more dynamical manner and a proactive user equipment context transfer.

The present invention has inter alia the following advantages:

In contrast to proposals of type "reactive" basing on a mobility management entity offload on periodic tracking area update handling only, the time for offload is reduced greatly from approximately an hour to approximately a few minutes, assuming default settings for periodic tracking area update timers and based on assumptions/estimations in particular in the description of FIG. 4.

The user equipments are not involved in the procedure of exchanging user equipment context between mobility management entities, so enhancements are necessary only in core network entities, i.e. in the mobility management entity and the serving gateways and not in the user equipment or evolved node Bs.

The present invention provides an enhanced flexibility, since a user equipment context may be offloaded also in other situations, like a controlled taking out of service for a mobility management entity for maintenance or re-configuration or allowed re-balancing in a faster and more efficient way.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for distributing of user equipment context in an evolved packet system, including
a plurality of user equipment,
at least one eNodeB,
at least a first mobility management entity and a second mobility management entity, and
at least one serving gateway connected to at least the first and second mobility management entities,
the plurality of user equipment being connected via one of the eNodeBs to the second mobility management entity and to the at least one serving gateway,
a user equipment context for each of the plurality of user equipment each being stored at the second mobility management entity, the method comprising:
a) transferring in bulk all user equipment contexts of the plurality of user equipment contexts stored at the second mobility management entity to the first mobility management entity within a first transfer time, each user equipment context including, for each user equipment, a mobility management entity code;
b) reconfiguring the mobility management entity codes by and in the first mobility management entity;
c) storing said transferred user equipment contexts of the plurality of user equipment in the first mobility management entity; and
d) transferring the reconfigured mobility management entity codes to the at least one eNodeB.

2. The method according to claim 1, wherein the transferring bulk user equipment contexts according to step a) is performed additionally for the serving gateways.

3. The method according to claim 2, further comprising:
d) sending at least one activation message to the serving gateway by the first mobility management entity.

4. The method according to claim 1, further comprising:
e) switching the second mobility management entity to an energy saving state.

5. The method according to claim 1,
wherein at least one of the user equipment contexts stored at the second mobility management entity is altered at the second mobility management entity during the first transfer time,
the method further comprising:
f) subsequently transferring each of the at least one altered user equipment contexts to the first mobility management entity within a second transfer time.

6. The method according to claim 5, wherein at least one of the at least one altered user equipment contexts stored at the second mobility management entity is further altered at the second mobility management entity during the second transfer time,
the method further comprising:
g) subsequently transferring each of the at least one further altered user equipment contexts to the first mobility management entity within a third transfer time.

7. The method according to claim 5, wherein transferring in bulk the user equipment contexts according to step f) is performed additionally for the serving gateways.

8. The method according to claim 1, wherein the second mobility management entity to which the user equipment is connected, initiates the transfer of the user equipment context.

9. The method according to claim 1, wherein each of the user equipment contexts includes a correlation identifier.

10. The method according to claim 1, wherein when an energy saving state of the second mobility management entity is revoked, at least corresponding steps a)-c) are performed with the first and second mobility management entities being switched.

11. The method according to claim 1, wherein initiation of step a) is triggered externally of the second mobility management entity by a device in an operation-and-maintenance system.

12. The method according to claim 2, further comprising:
e) switching the second mobility management entity to an energy saving state.

13. The method according to claim 3, further comprising:
e) switching the second mobility management entity to an energy saving state.

14. The method according to claim 2, wherein at least one of the user equipment contexts stored at the second mobility management entity is altered at the second mobility management entity during the first transfer time,
the method further comprising:
f) subsequently transferring each of the at least one altered user equipment contexts to the first mobility management entity within a second transfer time.

15. The method according to claim 3, wherein at least one of the user equipment contexts stored at the second mobility management entity is altered at the second mobility management entity during the first transfer time,
the method further comprising:
f) subsequently transferring each of the at least one altered user equipment contexts to the first mobility management entity within a second transfer time.

16. The method according to claim 6, wherein transferring in bulk the user equipment contexts according to step g) is performed additionally for the serving gateways.

17. The method according to claim 8, wherein the second mobility management entity to which the user equipment is connected, initiates the transfer of the user equipment context via a bulk data transfer mechanism.

18. A system for distributing of user equipment context in an evolved packet system, comprising
- a plurality of user equipment;
- at least one eNodeB;
- a first mobility management entity;
- a second mobility management entity; and
- at least one serving gateway connected to the first and second mobility management entities,
- wherein the plurality of user equipment is connected via one of the eNodeBs to the second mobility management entity,
- a user equipment context for each of the plurality of user equipment is each stored at the second mobility management entity
- the second mobility management entity is configured to transfer in bulk all user equipment contexts of the plurality of user equipment contexts stored at the second mobility management entity to the first mobility management entity within a transfer time, each user equipment context including, for each user equipment, a mobility management entity code, and
- the first mobility management entity is configured to reconfigure the mobility management entity codes in the first mobility management entity, to transfer the reconfigured mobility management entity codes to the at least one eNodeB, and to store said transferred user equipment contexts of the plurality of user equipment.

19. The system according to claim 18, wherein at least the second mobility management entity has an energy saving state as at least one operational state of the second mobility management entity.

* * * * *